(12) United States Patent
Sippel et al.

(10) Patent No.: US 11,066,947 B2
(45) Date of Patent: Jul. 20, 2021

(54) TURBINE SHROUD ASSEMBLY WITH SEALED PIN MOUNTING ARRANGEMENT

(71) Applicants: Rolls-Royce Corporation, Indianapolis, IN (US); Rolls-Royce North American Technologies Inc., Indianapolis, IN (US)

(72) Inventors: Aaron D. Sippel, Zionsville, IN (US); Ted J. Freeman, Danville, IN (US); Alexandra Baucco, Indianapolis, IN (US); Jeffrey A. Walston, Indianapolis, IN (US)

(73) Assignees: Rolls-Royce Corporation, Indianapolis, IN (US); Rolls-Royce North American Technologies Inc., Indianapolis, IN (US)

( * ) Notice: Subject to any disclaimer, the term of this patent is extended or adjusted under 35 U.S.C. 154(b) by 32 days.

(21) Appl. No.: 16/719,367

(22) Filed: Dec. 18, 2019

(65) Prior Publication Data
US 2021/0189897 A1    Jun. 24, 2021

(51) Int. Cl.
*F01D 11/08*    (2006.01)
*F01D 25/24*    (2006.01)

(52) U.S. Cl.
CPC .......... *F01D 11/08* (2013.01); *F05D 2220/32* (2013.01); *F05D 2240/55* (2013.01); *F05D 2240/90* (2013.01)

(58) Field of Classification Search
CPC .......... F01D 5/284; F01D 11/08; F01D 11/18; F01D 25/246; F05D 2220/32; F05D 2240/55; F05D 2240/90
See application file for complete search history.

(56) References Cited

U.S. PATENT DOCUMENTS

| | | |
|---|---|---|
| 3,066,911 A | 12/1962 | Anderson et al. |
| 4,676,715 A | 6/1987 | Imbault et al. |
| 5,203,673 A | 4/1993 | Evans |
| 5,295,787 A | 3/1994 | Leonard et al. |
| 5,368,444 A | 11/1994 | Anderson |
| 5,405,245 A | 4/1995 | Cornelius |
| 5,441,385 A | 8/1995 | Boyd et al. |
| 5,459,995 A | 10/1995 | Norton et al. |
| 5,584,651 A | 12/1996 | Pletraszkiewicz et al. |
| 5,593,276 A | 1/1997 | Proctor et al. |
| 6,821,085 B2 | 11/2004 | Darkins, Jr. et al. |
| 6,877,952 B2 | 4/2005 | Wilson |
| 6,884,026 B2 | 4/2005 | Glynn et al. |
| 7,210,899 B2 | 5/2007 | Wilson |
| 7,416,362 B2 | 8/2008 | North |
| 7,494,317 B2 | 2/2009 | Keller et al. |
| 7,534,086 B2 | 5/2009 | Mazzola et al. |
| 7,563,071 B2 | 7/2009 | Campbell et al. |
| 7,874,059 B2 | 1/2011 | Morrison et al. |
| 8,388,309 B2 | 3/2013 | Marra et al. |

(Continued)

*Primary Examiner* — Igor Kershteyn
(74) *Attorney, Agent, or Firm* — Barnes & Thornburg LLP

(57) ABSTRACT

A shroud assembly adapted for use with a gas turbine engine includes a seal segment, a carrier, and a mount system. The seal segment extends circumferentially at least partway around an axis to define a gas path boundary of the shroud assembly. The carrier is configured to support the seal segment in position radially relative to the axis. The mount system couples the seal segment with the carrier.

20 Claims, 9 Drawing Sheets

(56) References Cited

U.S. PATENT DOCUMENTS

| | | | |
|---|---|---|---|
| 8,790,067 B2 | 7/2014 | McCaffrey et al. | |
| 8,905,709 B2 | 12/2014 | Dziech et al. | |
| 8,944,756 B2 | 2/2015 | Lagueux | |
| 8,979,489 B2 | 3/2015 | Taillant et al. | |
| 9,587,504 B2 | 3/2017 | McCaffrey et al. | |
| 9,587,517 B2 | 3/2017 | Vetters et al. | |
| 9,863,265 B2 | 1/2018 | Stapleton | |
| 9,874,104 B2 | 1/2018 | Shapiro | |
| 10,030,541 B2 | 7/2018 | Vetters et al. | |
| 10,082,039 B2 | 9/2018 | Hanson | |
| 10,174,628 B2 | 1/2019 | Humhauser et al. | |
| 10,301,960 B2 | 5/2019 | Stapleton et al. | |
| 10,370,991 B2 | 8/2019 | Wilson et al. | |
| 10,378,385 B2 | 8/2019 | Tesson et al. | |
| 10,378,386 B2 | 8/2019 | Roussille et al. | |
| 10,422,241 B2 | 9/2019 | McCaffrey et al. | |
| 10,683,770 B2 | 6/2020 | Freeman et al. | |
| 2013/0004306 A1 | 1/2013 | Albers et al. | |
| 2018/0051581 A1 | 2/2018 | Quennehen et al. | |
| 2018/0051591 A1 | 2/2018 | Quennehen et al. | |
| 2018/0073398 A1 | 3/2018 | Quennehen et al. | |
| 2018/0080343 A1 | 3/2018 | Groleau et al. | |
| 2018/0156069 A1 | 6/2018 | Quennehen et al. | |
| 2018/0195401 A1* | 7/2018 | Sippel | F01D 11/005 |
| 2018/0340440 A1* | 11/2018 | Freeman | F01D 9/042 |
| 2018/0355761 A1 | 12/2018 | Maar | |
| 2019/0040758 A1 | 2/2019 | Quennehen et al. | |
| 2019/0040761 A1 | 2/2019 | Carlin et al. | |
| 2019/0084892 A1 | 3/2019 | Subramanian et al. | |
| 2019/0101027 A1 | 4/2019 | Lepretre et al. | |
| 2019/0128132 A1 | 5/2019 | Tableau et al. | |
| 2021/0025284 A1* | 1/2021 | Sippel | F01D 25/246 |

\* cited by examiner

TURBINE SHROUD ASSEMBLY WITH SEALED PIN MOUNTING ARRANGEMENT

FIELD OF THE DISCLOSURE

The present disclosure relates generally to gas turbine engines, and more specifically to mounting turbine assembly components for use with gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Compressors and turbines typically include alternating stages of static vane assemblies and rotating wheel assemblies. The rotating wheel assemblies include disks carrying blades around their outer edges. When the rotating wheel assemblies turn, tips of the blades move along blade tracks included in static shrouds that are arranged around the rotating wheel assemblies. Such static shrouds may be coupled to an engine case that surrounds the compressor, the combustor, and the turbine.

Some shrouds positioned in the turbine may be exposed to high temperatures from products of the combustion reaction in the combustor. Such shrouds sometimes include components made from materials that have different coefficients of thermal expansion. Due to the differing coefficients of thermal expansion, the components of some turbine shrouds expand at different rates when exposed to combustion products. In some examples, coupling such components with traditional arrangements may not allow for the differing levels of expansion and contraction during operation of the gas turbine engine.

SUMMARY

The present disclosure may comprise one or more of the following features and combinations thereof.

A shroud assembly adapted for use with a gas turbine engine may include a seal segment, a carrier, and a mount system. The seal segment may comprise ceramic matrix composite materials. The carrier may comprise metallic materials and may be configured to support the seal segment in position radially relative to the axis. The mount system may be configured to couple the seal segment with the carrier.

In some embodiments, the seal segment may include a shroud wall and at least one mount post. The shroud wall may extend circumferentially partway around an axis to define a gas path boundary of the shroud assembly. At least one mount post may extend radially outward away from the shroud wall.

In some embodiments, the carrier may include an outer wall, a first support arm, and a second support arm. The outer wall may extend circumferentially at least partway about the axis. The first support arm may extend radially inward from the outer wall. The second support arm may extend radially inward from the outer wall.

In some embodiments, the second support arm may be spaced apart axially from the first support arm to define a cavity. The cavity may receive at least one mount post of the seal segment.

In some embodiments, the mount system may include at least one pin and a cover plate. The pin may extend axially through a first opening in the first support arm, a second opening in at least one mount post, and into a third opening in the second support arm. The pin may extend through the first opening, the second opening, and into the third opening to interlock the seal segment with the carrier. The cover plate may be coupled with the carrier and may be engaged with the first support arm to close the first opening. The cover plate may close the first opening to block gases from passing into the cavity through the first opening and to block the pin from escaping through the first opening.

In some embodiments, the first support arm may be formed to define a retaining slot. The retaining slot may be sized to receive a portion of the cover plate. In some embodiments, the cover plate may be slidingly received in the retaining slot.

In some embodiments, the first support arm may include a band, an outer flange, and an inner flange. The band may extend radially inward from the outer wall of the carrier. The outer flange may extend axially away from the band and radially inward relative to the axis to form a portion of the retaining slot. The inner flange may extend axially away from the band and radially outward relative to the axis to define another portion of the retaining slot.

In some embodiments, the retaining slot may extend in a linear path. In some embodiments, the cover plate may include an outer radial wall and an inner radial wall. The outer radial wall and the inner radial wall may be planar to allow the cover plate to translate in a single linear direction into the retaining slot. In some embodiments, the retaining slot and the cover plate may curve circumferentially partway about the axis.

In some embodiments, the cover plate may include an anti-rotation feature. The anti-rotation feature may engage the first support arm to block circumferential movement of the cover plate in the retaining slot relative to the carrier.

In some embodiments, the retaining slot may extend radially through the outer wall and partway into the first support arm. The retaining slot may open into the first opening.

In some embodiments, the cover plate may include a panel and a peg. The panel may engage the fore support arm. The peg may extend axially into the first opening and may mate with the threads formed in the first opening.

In some embodiments, the cover plate may be integrally formed with the pin to form a single, piece component. The pin may extend from the peg.

In some embodiments, the cover plate may include a body and an anti-rotation tab. The anti-rotation tab may be coupled with the body and configured to plastically deform relative to the body. The anti-rotation tab may engage the first support arm to block circumferential movement of the cover plate relative to the carrier.

According to another aspect of the present disclosure, a shroud assembly adapted for use with a gas turbine engine may include a seal segment, a carrier, and a mount system. The seal segment may extend circumferentially at least partway around an axis to define a gas path boundary of the shroud assembly. The carrier may be configured to support the seal segment in position radially relative to the axis. The mount system may be configured to couple the seal segment with the carrier.

In some embodiments, the carrier may include an outer wall, a first support arm, and a second support arm. The outer wall may extend circumferentially at least partway about the axis. The first support arm may extend radially inward from the outer wall. The second support arm may extend radially inward from the outer wall.

In some embodiments, the second support arm may be spaced apart axially from the first support arm to define a cavity. The cavity may receive the seal segment.

In some embodiments, the mount system may include at least one pin and a cover plate. The pin may extend axially through a first opening in the first support arm, a second opening in the seal segment, and into a third opening in the second support arm. The cover plate may be coupled with the carrier and may be engaged with the first support arm to close the first opening.

In some embodiments, the first support arm may be formed to define a retaining slot. The retaining slot may be sized to receive a portion of the cover plate. In some embodiments, the cover plate may be slidingly received in the retaining slot.

In some embodiments, the first support arm may include a band, an outer flange, and an inner flange. The band may extend radially inward from the outer wall of the carrier. The outer flange may extend axially away from the band and radially inward relative to the axis to form a portion of the retaining slot. The inner flange may extend axially away from the band and radially outward relative to the axis to define another portion of the retaining slot.

In some embodiments, the retaining slot may extend in a linear path. In some embodiments, the cover plate may include an outer radial wall and an inner radial wall. The outer radial wall and the inner radial wall may be planar to allow the cover plate to translate in a single linear direction into the retaining slot.

In some embodiments, the retaining slot and the cover plate may curve circumferentially partway about the axis. In some embodiments, the retaining slot may extend radially through the outer wall and partway into the first support arm and may open into the first opening.

In some embodiments, the cover plate may include a panel and a peg. The panel may engage the fore support arm. The peg may extend axially into the first opening and may mate with the threads formed in the first opening.

In some embodiments, the cover plate may be integrally formed with the pin to form a single, piece component. The pin may extend from the peg.

According to another aspect of the present disclosure, a method may include providing a seal segment, a carrier, and a mounting assembly. The carrier may include an outer wall that extends circumferentially at least partway about the axis, a first support arm that extends radially inward from the outer wall, and a second support arm that extends radially inward from the outer wall. The second support arm may be spaced axially apart from the first support arm to define a cavity that receives a portion of the seal segment. The mount system may include a pin and a cover plate.

In some embodiments, the method may further include locating the seal segment in the cavity formed in the carrier so that a first opening formed in the first support arm, a second opening formed in the seal segment, and a third opening formed in the second support arm align. The method may further include inserting the pin axially through the first opening formed in the first support arm, the second opening formed in the seal segment, and the third opening formed in the second support arm to interlock the seal segment with the carrier.

In some embodiments, the method may further include coupling the cover plate to the first support arm to close the first opening. The cover plate may close the first opening to block gases from passing into the cavity through the first opening and to block the pin from escaping through the first opening.

In some embodiments, the method may further include engaging an anti-rotation feature formed in the cover plate with the first support arm of the carrier. The anti-rotation feature may engage the first support arm to block movement of the cover plate relative to the carrier.

These and other features of the present disclosure will become more apparent from the following description of the illustrative embodiments.

DETAILED DESCRIPTION OF THE DRAWINGS

Figure 1:
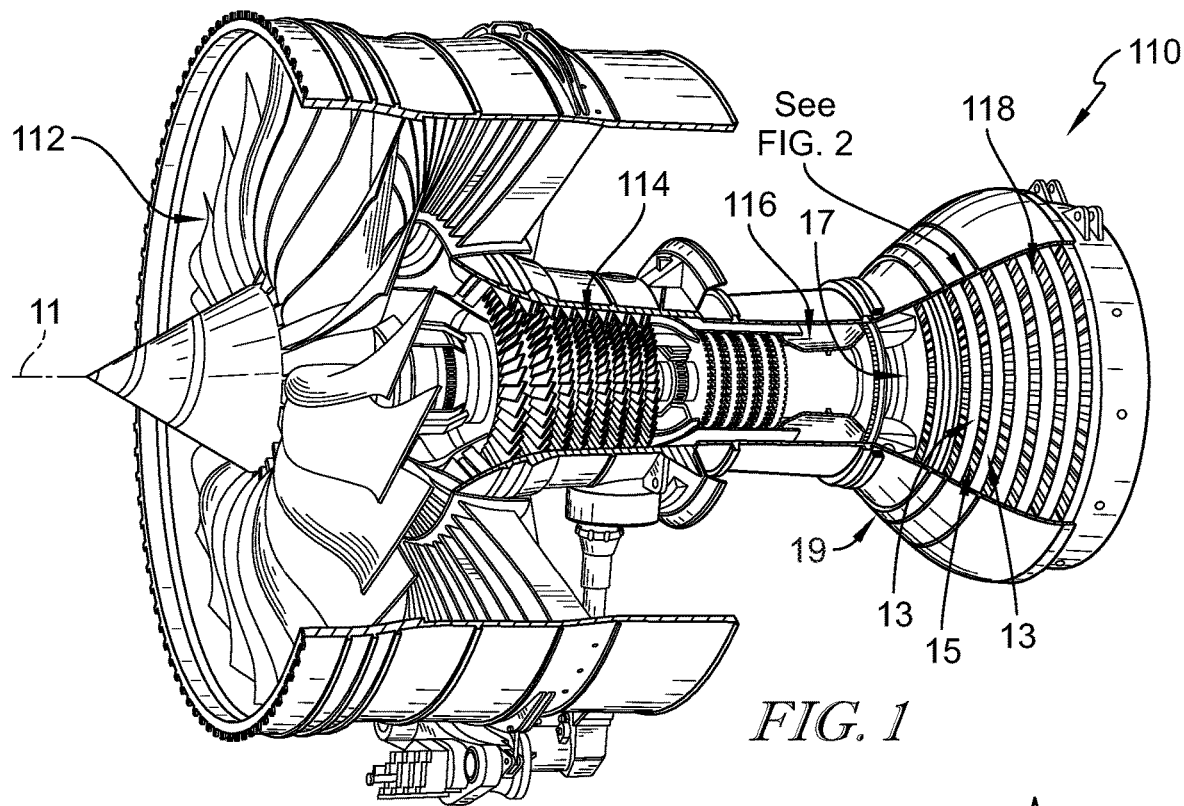
FIG. 1 is a cutaway view of a gas turbine engine that includes a fan, a compressor, a combustor, and a turbine, the turbine including rotating wheel assemblies configured to rotate about an axis of the engine and static turbine vane rings configured to direct air into downstream rotating wheel assemblies.

For the purposes of promoting an understanding of the principles of the disclosure, reference will now be made to a number of illustrative embodiments illustrated in the drawings and specific language will be used to describe the same.

Figure 2:
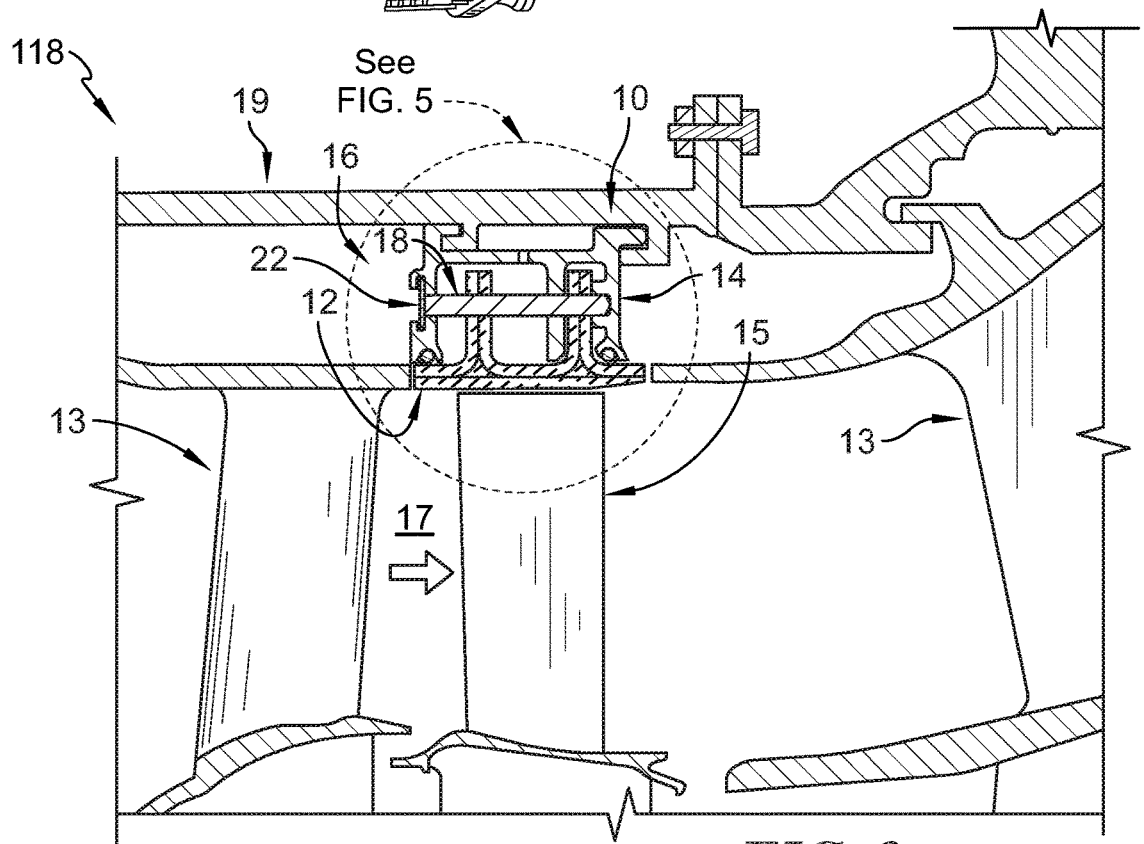
FIG. 2 is a section view of a portion of the gas turbine engine of FIG. 1 showing the turbine further includes a turbine shroud assembly positioned radially outward from blades of one of the rotating wheel assemblies, the turbine shroud assembly including a seal segment that defines a portion of a gas path of the gas turbine engine, a carrier that supports the seal segment relative to the axis, and a mount system having pins that extend axially through the seal segment and the carrier to couple the seal segment to the carrier and a cover plate coupled to the carrier to block axial movement of the pins and to seal the gaps created by the pin holes in the carrier.
Figure 3:
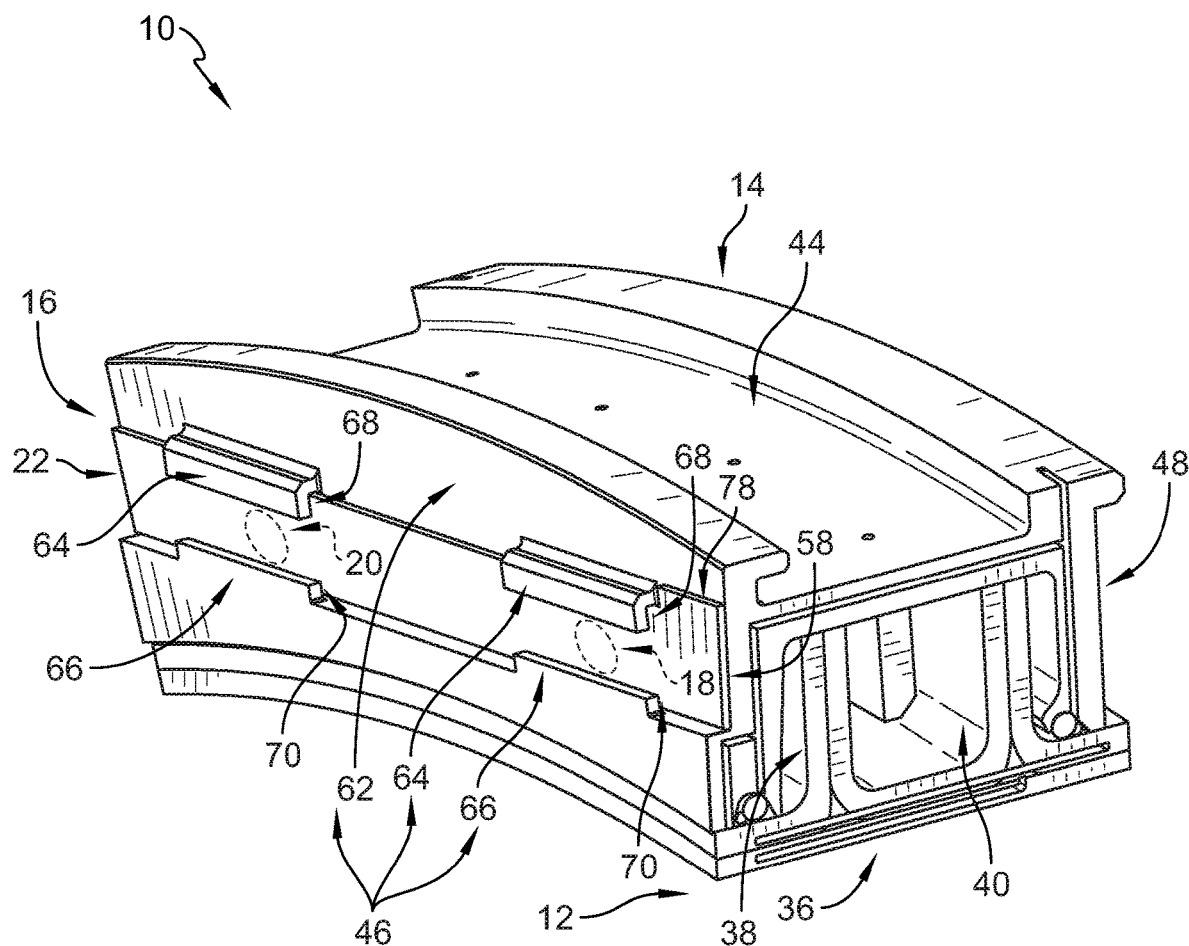
FIG. 3 is a perspective view of the turbine shroud assembly of FIG. 2 showing the seal segment coupled with the carrier via the axially extending pins and showing that the carrier is shaped to include a retaining slot that receives the cover plate which covers the pins to block axial movement of the pins and to block gases from passing through the pin holes into the carrier.

A turbine shroud assembly 10 according to the present disclosure is adapted for use with a gas turbine engine 110 as suggested in FIGS. 1 and 2. The turbine shroud assembly 10 includes a seal segment 12, a carrier 14, and a mount system 16 as shown in FIGS. 2 and 3. The seal segment 12 extends at least partway about an axis 11 of the gas turbine engine 110 to define a portion of a gas path 17 of the gas turbine engine 110. The carrier 14 supports the seal segment 12 in position radially relative to the axis 11. The mount system 16 couples the seal segment 12 with the carrier 14 and seals the turbine shroud assembly 10.

The mount system 16 includes at least one pin, illustratively two pins 18, 20, and a cover plate 22 as shown in FIGS. 2-5. The pin 18 extends axially through a first opening 26 formed in a first support arm 46 of the carrier 14, a second opening 28 formed in the seal segment 12, and into a third opening 30 formed in a second support arm 48 of the carrier 14. Likewise, the pin 20 extends through similar openings 26, 28, 30 and is circumferentially spaced apart from the pin 18. In the illustrative embodiment, the opening 26 for the pin 20 may be a different size and/or shape than the hole 26 for pin 18.

Each pin 18, 20 extends through respective openings 26, 28, 30 to interlock the seal segment 12 with the carrier 14. The cover plate 22 is coupled with the carrier 14 and engaged with the first support arm 46. The cover plate 22 engages with the first support arm 46 to close the first openings 26 and block gases from passing into a cavity 42 formed in the carrier 14 through the first openings 26. The cover plate 22 also engages the first support arm 46 to block the pins 18, 20 from escaping through the first openings 26.

The seal segment 12 of the illustrative turbine shroud assembly 10 is made entirely of ceramic matrix composite materials and the carrier 14 is made of metallic materials. The ceramic matrix composite seal segment 12 is adapted to withstand high temperatures, but may have relatively low strength compared to the metallic carrier 14. The carrier 14 provides structural strength to the turbine shroud assembly 10 by receiving the force loads applied to the seal segment 12 and transferring them to a casing that surrounds the turbine shroud assembly 10. The pins 18, 20 provide a simplified attachment of the ceramic matrix composite seal segment 12 to the carrier 14 that may reduce or eliminate stresses in the ceramic matrix composite seal segment 12.

However, the pins 18, 20 may create leakage paths in the turbine shroud assembly 10 that may otherwise make pressurizing the cavity 42 difficult and may weaken the carrier 14, since the carrier 14 may not be capable of withstanding directly the high temperatures experienced by the seal segment 12. As such, the cover plate 22 engages the first support arm 46 to seal the cavity 42 via the openings 26 and block removal of the pins 18, 20. In the illustrative embodiment, the pressure in the cavity 42 is lower than the pressure outside of the first support arm 46, but greater than the pressure of the gas path 17. This pressure difference across the first support arm 46 is used to urge the cover plate 22 into engagement with the carrier 14 to seal the openings 26 in the carrier 14.

The turbine shroud assembly 10 is adapted for use in the gas turbine engine 110, which includes a fan 112, a compressor 114, a combustor 116, and a turbine 118 as shown in FIG. 1. The fan 112 is driven by the turbine 118 and provides thrust for propelling an aircraft. The compressor 114 compresses and delivers air to the combustor 116. The combustor 116 mixes fuel with the compressed air received from the compressor 114 and ignites the fuel. The hot, high pressure products of the combustion reaction in the combustor 116 are directed into the turbine 118 to cause the turbine 118 to rotate about the axis 11 of the gas turbine engine 110 and drive the compressor 114 and the fan 112. In other embodiments, the fan 112 may be omitted and the turbine 118 drives a propeller, drive shaft, or other suitable alternative.

The turbine 118 includes a plurality of the static turbine vane rings 13 that are fixed relative to the axis 11 and a plurality of the bladed wheel assemblies 15 as suggested in FIGS. 1 and 2. Each turbine vane ring 13 includes a plurality of airfoils. The hot gases are conducted through the gas path 17 and interact with the bladed wheel assemblies 15 to cause the bladed wheel assemblies 15 to rotate about the axis 11. The turbine vane rings 13 are positioned to direct the gases toward the bladed wheel assemblies 15 with a desired orientation.

In the illustrative embodiment, the turbine shroud assembly 10 is configured to extend around one of the bladed wheel assemblies 15. In other embodiments, the shroud assembly 10 may be used in the compressor 114 such that it is arranged around blades in the compressor 114. In yet other embodiments, the mount system 16 may be used to couple vane segments and other components to carriers or cases of the turbine or compressor.

Figure 4:
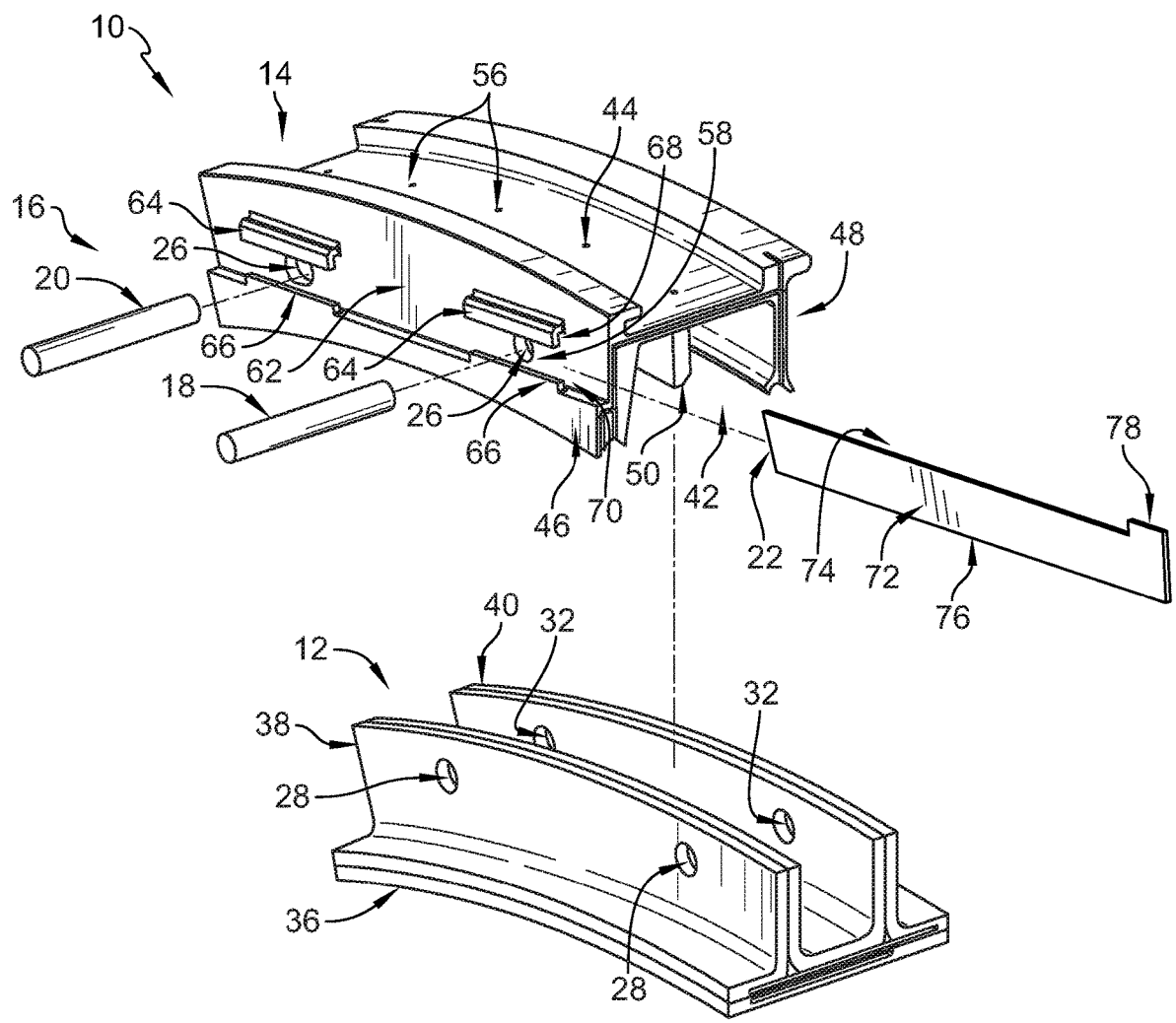
FIG. 4 is an exploded view of the turbine shroud assembly of FIG. 3 showing the carrier is shaped to define a channel for receiving the shroud segment, the shroud segment includes a shroud wall and mount posts adapted to extend into the channel, the pins are configured to extend through the carrier and the mount posts, and further suggesting that the cover plate is configured to slide into the retaining slot formed on a face of the carrier.

The seal segment 12 includes a shroud wall 36, a first mount post 38, and a second mount post 40 as shown in FIGS. 2-5. The shroud wall 36 extends circumferentially partway around the axis 11 to define the gas path boundary of the turbine shroud assembly 10. The first mount post 38 extends radially outward away from the shroud wall 36. The second mount post 40 is spaced apart axially from the first mount post 38 and extends radially outward from the shroud wall 36. In the illustrative embodiment, the first mount post 38 includes the second openings 28 while the second mount post 40 includes fourth openings 32 as shown in FIGS. 3 and 4. In other embodiments, the seal segment 12 may only include one mount post 38, 40 that extends radially outward from the shroud wall 36. The seal segment 12 includes at least one mount post or other attachment feature for receiving one or more pins 18, 20.

In the illustrative embodiment, the seal segment 12 comprises ceramic matrix composite materials, while the carrier 14 and the mount system 16 comprise metallic materials. In other embodiments, the seal segment 12, the carrier 14, and the mount system 16 may each comprise any suitable materials including ceramics, ceramic matrix composites, metals, alloys, super alloys, etc.

Figure 5:
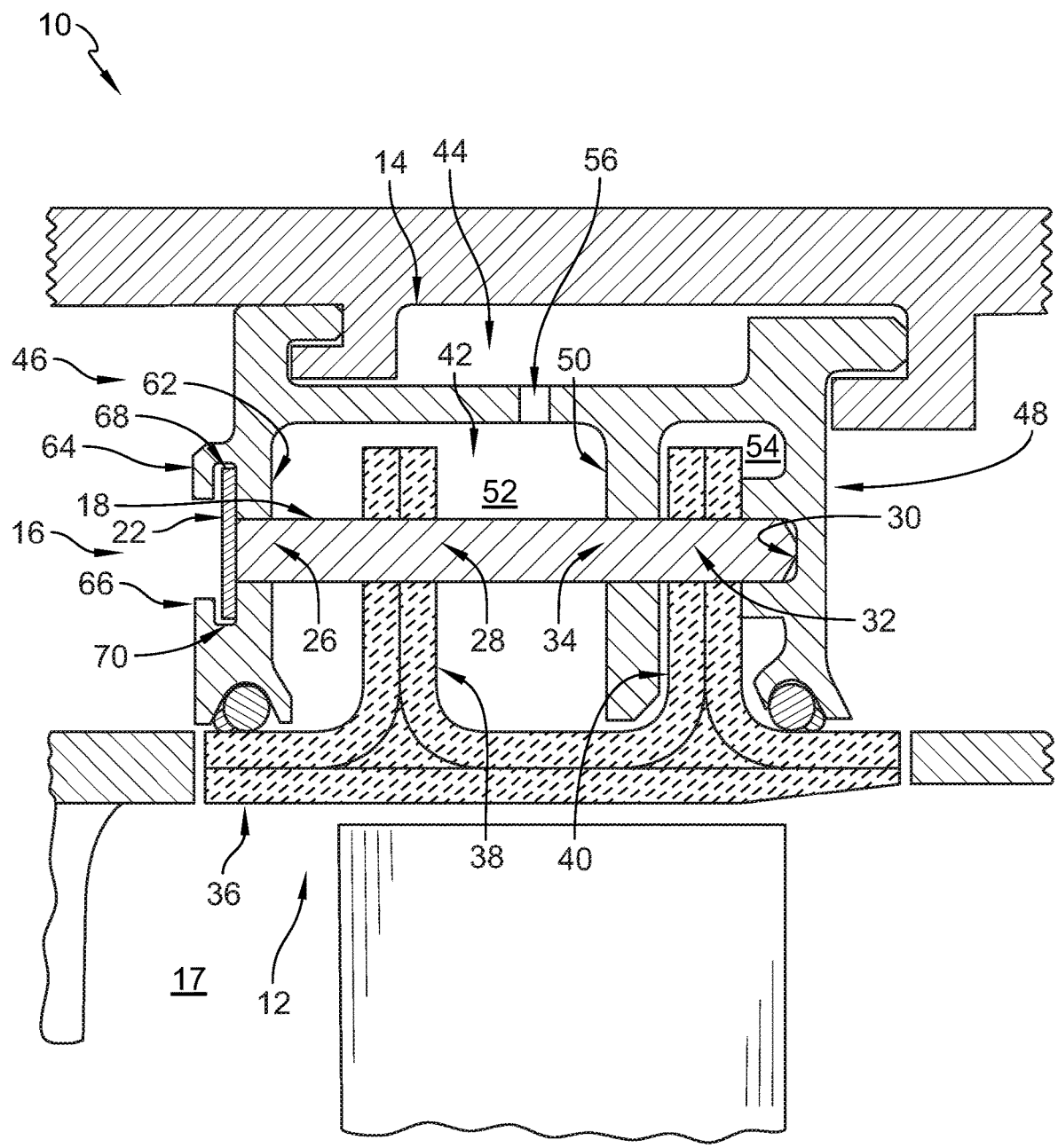
FIG. 5 is a detail view of the turbine shroud assembly of FIG. 2 showing the carrier coupled with a case of the turbine and that the carrier includes an axially and circumferentially extending outer wall, a radially extending fore support arm, a radially extending aft support arm, and an intermediate arm that extends radially inward from the outer wall axially between the fore and aft support arms and that the pin extends axially through the fore support arm, the seal segment, and the intermediate support arm into the aft support arm to couple the seal segment to the carrier.

The carrier 14 includes an outer wall 44, the first support arm 46, and the second support arm 48 as shown in FIGS. 3-5. The outer wall 44 extends circumferentially at least partway about the axis 11. The first or fore support arm 46 extends radially inward from the outer wall 44. The second or aft support arm 48 extends radially inward from the outer wall 44 and is spaced apart axially aft from the fore support arm 46 to define the cavity 42 that receives the mount posts 38, 40 of the seal segment 12.

In the illustrative embodiment, the carrier 14 further includes a third or intermediate support arm 50 as shown in FIGS. 3-5. The intermediate support arm 50 extends radially inward from the outer wall 44 axially between the fore support arm 46 and the aft support arm 48. The intermediate support arm 50 divides the cavity 42 into a first section 52 that receives the first mount post 38 and a second section 54 that receives the second mount post 40.

In the illustrative embodiment, the intermediate support arm 50 is shaped to include fifth openings 34 that receive the pin 18, 20. The pins 18, 20 extend through the first opening 26 in the fore support arm 46, the second opening 28 in the first mount post 38, the fifth opening 34 in the intermediate support arm 50, the fourth opening 32 in the second mount post 40, and into the third opening 30 in the aft support arm 48.

The second and third support arms 48, 50 form a clevis feature around the second mount post 40 in the illustrative embodiment. The clevis feature may help prevent the pins 18, 20 from bending, which may reduce the stress around the openings formed in the ceramic matrix composite material of the seal segment 12.

The outer wall 44 of the carrier 14 is formed to define a plurality of cooling holes 56 as shown in FIGS. 3-5. The cooling holes 56 extend radially through the outer wall 44 and open into the first section 52 and/or the second section 54 of the cavity 42. The cooling holes 56 open into the first section 52 in the illustrative embodiment. The cooling holes 56 are configured to supply a flow of cooling air to the backside of the seal segment 12 and reduce thermal stresses in the seal segment 12. The cooling holes 56 may also be used to pressurize the cavity 42.

The fore support arm 46 is formed to define a retaining slot 58 as shown in FIGS. 3-5. The retaining slot 58 is sized to receive a portion of the cover plate 22 and the cover plate 22 is slidingly received in the retaining slot 58. In the illustrative embodiment, the retaining slot 58 extends in a linear path along the fore support arm 46.

The fore support arm 46 includes a band 62, an outer flange 64, and an inner flange 66 as shown in FIGS. 2-5. The band 62 extends radially inward from the outer wall 44 of the carrier 14. The outer flange 64 extends axially away from the band 62 and radially inward relative to the axis 11 to form an outer portion 68 of the retaining slot 58. The inner flange 66 extends axially away from the band 62 and radially outward relative to the axis 11 to define an inner portion 70 of the retaining slot 58. In the illustrative embodiment, the first opening 26 is located radially between the outer flange 64 and the inner flange 66.

In the illustrative embodiment, the fore support arm 46 includes a plurality of outer flanges 64 and a plurality of inner flanges 66 as shown in FIG. 4. Each of the outer flanges 64 and inner flanges 66 is spaced apart along the linear path to couple the cover plate 22 at multiple points on the fore support arm 46.

The cover plate 22 includes a body 72, an outer radial wall 74, and an inner radial wall 76 as shown in FIGS. 4 and 5. The outer and inner radial walls 74, 76 are planar to allow the cover plate 22 to translate in a single linear direction into the retaining slot 58. The cover plate 22 is flat and rectangular in the illustrative embodiment.

In the illustrative embodiment, the cover plate 22 further includes an anti-rotation feature 78 as shown in FIG. 4. The anti-rotation feature 78 engages the fore support arm 46 to block movement of the cover plate 22 in the retaining slot 58 relative to the carrier 14. The anti-rotation feature 78 is a tab 78 that extends from the outer radial wall 74 of the cover plate 22 and engages the outer flange 64 of the fore support arm 46 in the illustrative embodiment. The anti-rotation feature 78 may materialize in other ways in other embodiments. For example, the anti-rotation feature 78 may include a tab that extends from the carrier 14, may be provided by deforming one of the carrier 14 and cover plate 22, or include an insert located between the carrier 14 and the cover plate 22.

A method of assembling and using the turbine shroud assembly 10 may include several steps. The method includes locating the seal segment 12 in the cavity 42 formed in the carrier 14 so that the first opening 26 formed in the fore support arm 46, the second and fourth openings 28, 32 formed in the seal segment 12, and the third opening 30 formed in the aft support arm 48 align. Once the openings 26, 28, 30, 32, 34 are aligned. The method continues by inserting the pin 18 axially through the openings 26, 28, 30, 32, 34 to interlock the seal segment 12 with the carrier 14. The inserting step is repeated with the second pin 20.

After the pins 18, 20 are inserted, the method includes coupling the cover plate 22 to the fore support arm 46 to close the first opening 26 and block gases from passing into the cavity 42 and to block the pins 18, 20 from escaping through the first opening 26. The coupling step includes sliding the cover plate 22 into the retaining slot 58. The method may include blocking removal of the cover plate with the anti-rotation feature 78. The an anti-rotation feature 78 formed in the cover plate 22 is engaged with the fore support arm 46 of the carrier 14 to block movement of the cover plate 22 relative to the carrier 14.

Once the mount system 16 is installed, the method continues by installing the turbine shroud assembly 10 in the turbine section 118 of the gas turbine engine 110. During use of the turbine shroud assembly 10 in the gas turbine engine 110, the cavity 42 is pressurized and a pressure difference is created across the cover plate 22 to seal the opening 26.

Figure 6:
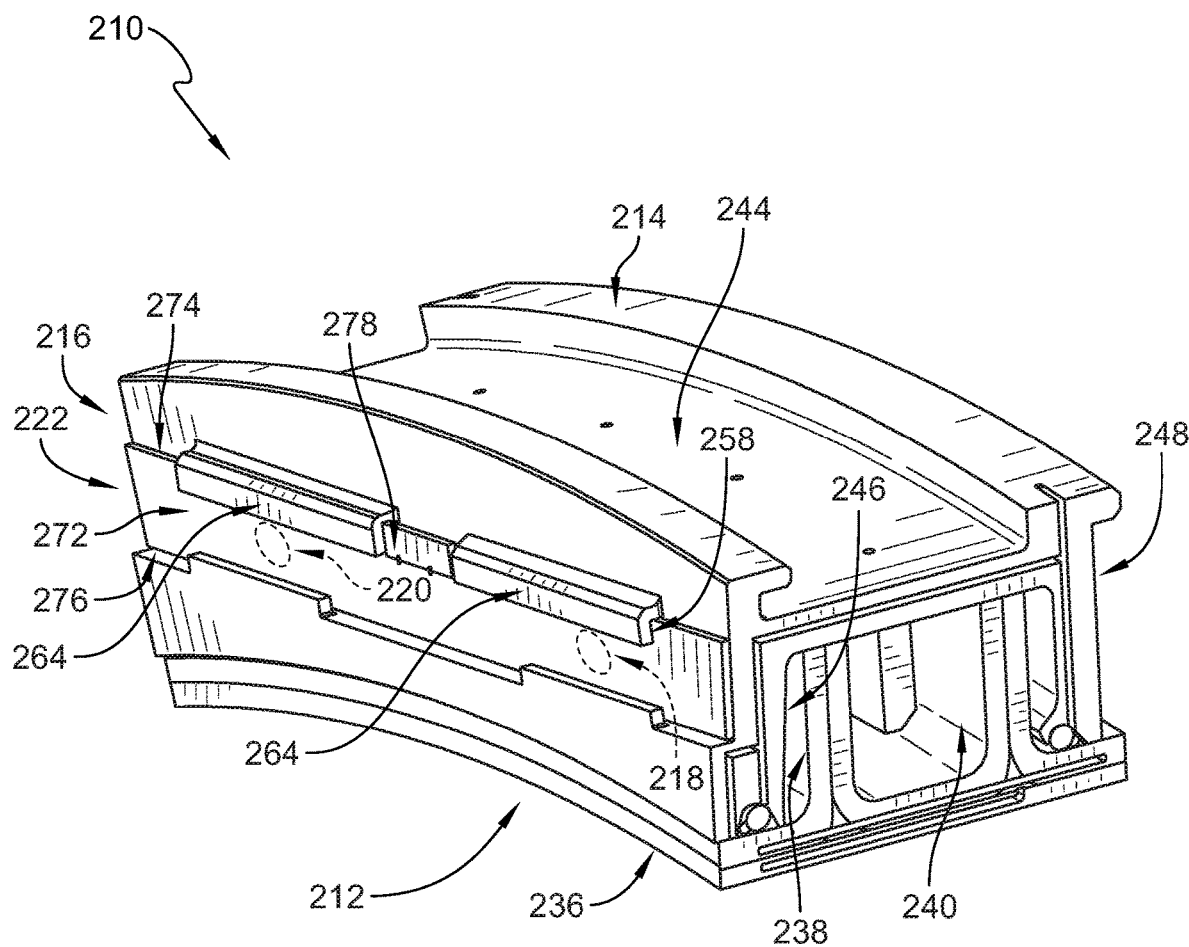
FIG. 6 is a perspective view of another embodiment of a turbine shroud assembly adapted for use in the gas turbine engine of FIG. 1 showing the turbine shroud assembly includes a seal segment, a carrier, and a mounting assembly, and further showing the carrier further includes at least one anti-rotation feature that extends toward and engages a cover plate of the mounting assembly to block movement of the cover plate about the axis relative to the carrier.

Another embodiment of a turbine shroud assembly 210 in accordance with the present disclosure is shown in FIG. 6. The turbine shroud assembly 210 is substantially similar to the turbine shroud assembly 10 shown in FIGS. 1-5 and described herein. Accordingly, similar reference numbers in the 200 series indicate features that are common between the turbine shroud assembly 10 and the turbine shroud assembly 210. The description of the turbine shroud assembly 10 is incorporated by reference to apply to the turbine shroud assembly 210, except in instances when it conflicts with the specific description and the drawings of the turbine shroud assembly 210.

The turbine shroud assembly 210 includes a seal segment 212, a carrier 214, and a mount system 216 as shown in FIG. 6. The seal segment 212 extends at least partway about an axis 11 of the gas turbine engine 110 to define a portion of the gas path 17 of the gas turbine engine 110. The carrier 214 is configured to support the seal segment 212 in position radially relative to the axis 11. The mount system 216 is configured to couple the seal segment 212 with the carrier 214 and seal the turbine shroud assembly 210.

The carrier 214 includes an outer wall 244, a first or fore support arm 246, and a second or aft support arm 248 as shown in FIG. 6. The outer wall 244 extends circumferentially at least partway about the axis 11. The fore support arm 246 extends radially inward from the outer wall 244. The aft support arm 248 that extends radially inward from the outer wall 244 and is spaced apart axially from the fore support arm 246.

The mount system 216 includes a cover plate 222 and pins 218, 220 as shown in FIG. 6. The cover plate 222 is coupled with the carrier 214 and engaged with the fore support arm 246 of the carrier 214 to block gases from passing through openings formed in the carrier 214. The openings may have a similar arrangement to the openings 26 in the previous embodiment. The pins 218, 220 extend through the carrier 214 and seal segment 212.

The cover plate 222 includes a body 272, an outer radial wall 274, an inner radial wall 276, and an anti-rotation feature 278 as shown in FIG. 6. The outer and inner radial walls 274, 276 are planar to allow the cover plate 222 to translate in a single linear direction into the retaining slot 258. The anti-rotation feature 278 is configured to plastically deform relative to the body 272 and engages the fore support arm 246 to block movement of the cover plate 222 in the retaining slot 258 relative to the carrier 214.

In the illustrative embodiment, the anti-rotation feature 278 is a pivotable tab 278 that engages a notch formed between the outer flanges 264 the fore support arm 246 of the carrier 214. The tab 278 is pivotable relative to the outer radial wall 274 of the cover plate 222 about a living hinge.

Figure 7:
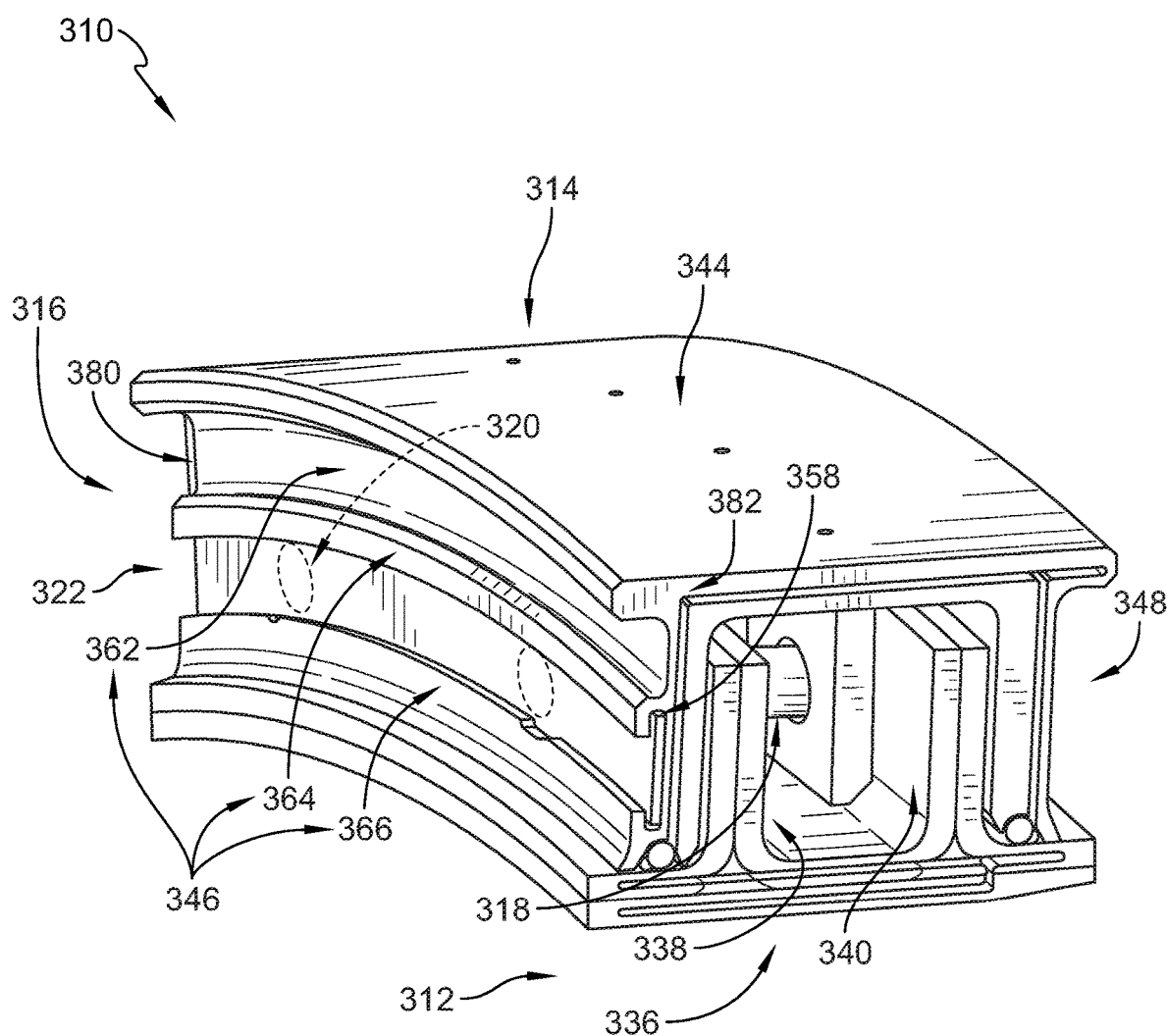
FIG. 7 is perspective view of another embodiment of a turbine shroud assembly adapted for use in the gas turbine engine of FIG. 1 showing the turbine shroud assembly includes a seal segment, a carrier, and a mounting assembly, the mount system including pins that extend axially through the seal segment and the carrier and a cover plate that extends circumferentially in an arcuate retaining slot formed in the carrier to block axial movement of the pin relative to the carrier.

Another embodiment of a turbine shroud assembly 310 in accordance with the present disclosure is shown in FIG. 7. The turbine shroud assembly 310 is substantially similar to the turbine shroud assembly 10 shown in FIGS. 1-5 and described herein. Accordingly, similar reference numbers in the 300 series indicate features that are common between the turbine shroud assembly 10 and the turbine shroud assembly 310. The description of the turbine shroud assembly 10 is incorporated by reference to apply to the turbine shroud assembly 310, except in instances when it conflicts with the specific description and the drawings of the turbine shroud assembly 310.

The turbine shroud assembly 310 includes a seal segment 312, a carrier 314, and a mount system 316 as shown in FIG. 7. The seal segment 312 extends at least partway about an axis 11 of the gas turbine engine 110 to define a portion of the gas path 17 of the gas turbine engine 110. The carrier 314 is configured to support the seal segment 312 in position radially relative to the axis 11. The mount system 316 is configured to couple the seal segment 312 with the carrier 314 and seal the turbine shroud assembly 310.

The carrier 314 includes an outer wall 344, a first or fore support arm 346, and a second or aft support arm 348 as shown in FIG. 7. The outer wall 344 extends circumferentially at least partway about the axis 11. The fore support arm 346 extends radially inward from the outer wall 344 and is formed to define a retaining slot 358 that is sized to receive a portion of mount system 316. The aft support arm 348 extends radially inward from the outer wall 44 and is spaced apart axially from the fore support arm 346.

The mount system 316 includes a cover plate 322 and pins 318, 320 as shown in FIG. 7. The cover plate 322 is coupled with the carrier 314 and engaged with the fore support arm 346 of the carrier 314 to block gases from passing through openings formed in the carrier 314. The openings may have a similar arrangement to the openings 26 in the previous embodiments.

In the illustrative embodiment, the cover plate 322 is slidingly received in the retaining slot 358. The retaining slot 358 and the cover plate 322 curve circumferentially partway about the axis 11 as shown in FIG. 7.

In the illustrative embodiment, the fore support arm 346 includes a band 362, an outer flange 364, and an inner flange 366 as shown in FIG. 7. The band 362 extends radially inward from the outer wall 344 of the carrier 314. The outer flange 364 extends axially away from the band 362 and radially inward relative to the axis 11 to form a portion of the retaining slot 58. The inner flange 366 extends axially away from the band 362 and radially outward relative to the axis 11 to define another portion of the retaining slot 358.

In the illustrative embodiment, the outer flange 364 and the inner flange 366 extends circumferentially from a first circumferential end 380 of the carrier 314 to a second circumferential end 382 of the carrier 314. The second circumferential end 382 of the carrier 314 is spaced apart circumferentially from the first circumferential end 380 to define a circumferential length of the carrier 314. The outer and inner flanges 364, 366 extend the entire circumferential length of the carrier 314 in the illustrative embodiment. In other embodiments, the outer and inner flanges 364, 366 are segmented along the circumferential length of the carrier 314.

Figure 8:
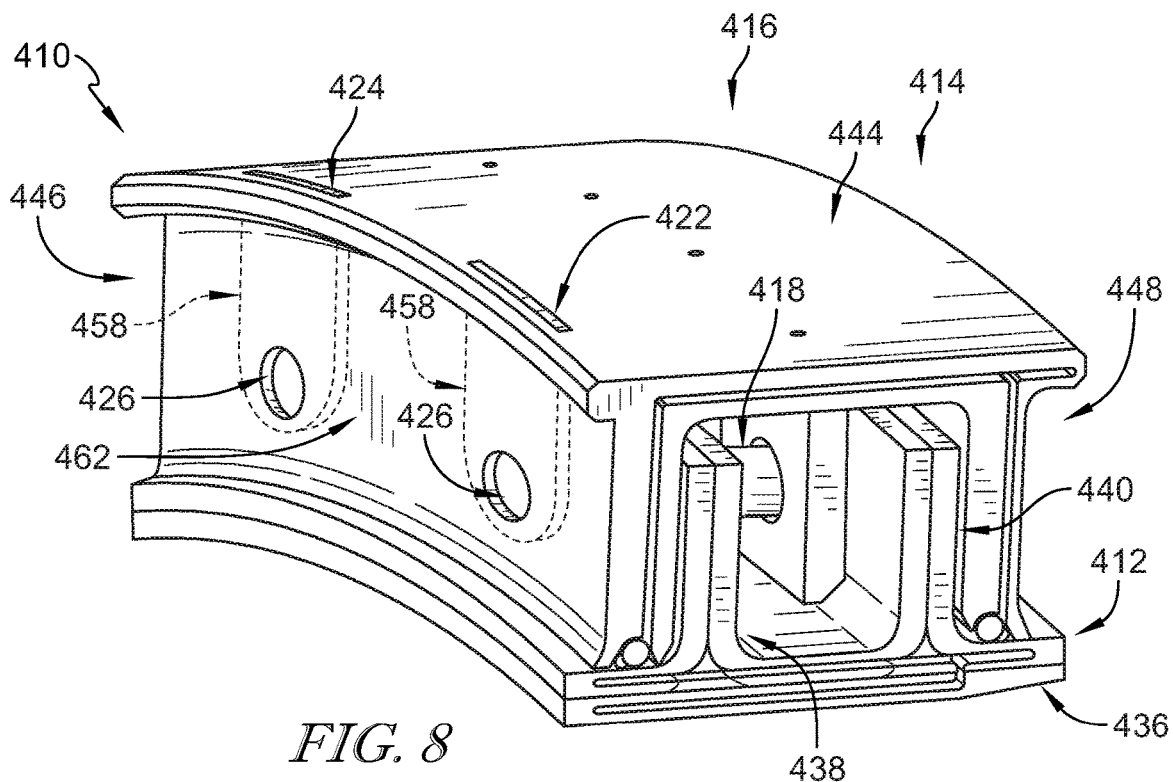
FIG. 8 is a perspective view of another embodiment of a turbine shroud assembly for use in the gas turbine engine of FIG. 1 showing the turbine shroud assembly includes a seal segment, a carrier, and a mounting assembly, the mount system including pins that extend axially through the seal segment and the carrier and cover plates that extend radially into retaining slots formed in the carrier to block axial movement of the pins relative to the carrier.
Figure 9:
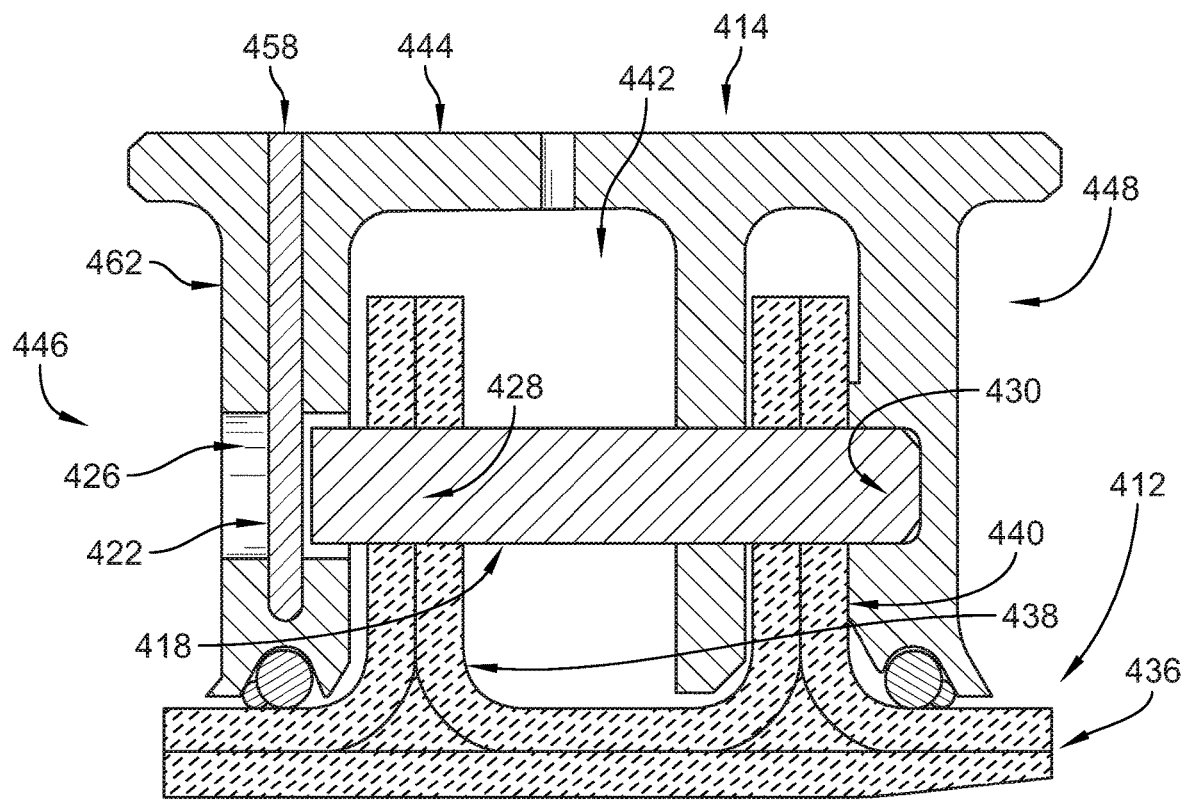
FIG. 9 is a section view of the turbine shroud assembly of FIG. 8 showing the carrier includes an outer wall that extends circumferentially at least partway about the axis, a fore support arm that extends radially inward from the outer wall, and an aft support arm that extends radially inward from the outer wall and spaced apart from the fore support arm to define a cavity that receives a portion of the seal segment, and further showing the cover plates slide radially through the outer wall and into the retaining slots formed in the fore support arm.

Another embodiment of a turbine shroud assembly 410 in accordance with the present disclosure is shown in FIGS. 8 and 9. The turbine shroud assembly 410 is substantially similar to the turbine shroud assembly 10 shown in FIGS. 1-5 and described herein. Accordingly, similar reference numbers in the 400 series indicate features that are common between the turbine shroud assembly 10 and the turbine shroud assembly 410. The description of the turbine shroud assembly 10 is incorporated by reference to apply to the turbine shroud assembly 410, except in instances when it conflicts with the specific description and the drawings of the turbine shroud assembly 410.

The turbine shroud assembly 410 includes a seal segment 412, a carrier 414, and a mount system 416 as shown in FIGS. 8 and 9. The seal segment 412 extends at least partway about an axis 11 of the gas turbine engine 110 to define a portion of the gas path 17 of the gas turbine engine 110. The carrier 414 is configured to support the seal segment 412 in position radially relative to the axis 11. The mount system 416 is configured to couple the seal segment 412 with the carrier 414 and seal the turbine shroud assembly 410.

The carrier 414 includes an outer wall 444, a first or fore support arm 446, and a second or aft support arm 448 as shown in FIG. 8. The outer wall 444 extends circumferentially at least partway about the axis 11. The fore support arm 446 extends radially inward from the outer wall 444. The aft support arm 448 extends radially inward from the outer wall 44 and is spaced apart axially from the fore support arm 446 to define a cavity 442 that receives the seal segment 412.

In the illustrative embodiment, the fore support arm 446 includes a band 462 with a plurality of first openings 426 and a plurality of retaining slots 458 as shown in FIGS. 8 and 9. The band 462 extends radially inward from the outer wall 444 of the carrier 414. The first openings 426 are spaced apart circumferentially and extend axially through the band 462. The retaining slots 458 each extend radially through the outer wall 444 and partway into the fore support arm 446 and opens into the corresponding first opening 426.

The mount system 416 includes pins 418, a first cover plate 422, and a second cover plate 424 as shown in FIGS. 8 and 9. Each pin 418 extends axially through the first opening 426 formed in the fore support arm 446 of the carrier 414, a second opening 428 formed in the seal segment 412, and into a third opening 430 formed in the aft support arm 448 of the carrier 414 to interlock the seal segment 412 with the carrier 414. Each of the cover plates 422, 424 is coupled with the carrier 414 and engaged with the fore support arm 446. The cover plates 422, 424 engage the fore support arm 446 to close the corresponding first openings 426 and block gases from passing into a cavity 442 formed in the carrier 414 through the first opening 426. The cover plates 422, 424 also engage the fore support arm 446 to block the pins 418 from escaping through the first opening 426.

In other embodiments, the fore support arm 446 may only be formed to define a single retaining slot 458 that receives a single cover plate 422 that closes both first openings 426 formed in the fore support arm 446. In some embodiments, the band 462 of the fore support arm 446 may include more than two cover plates 422 to close more than two openings 426.

A method of assembling and using the turbine shroud assembly 410 may include several steps. The method includes locating the seal segment 412 in the cavity 442 formed in the carrier 414 and inserting the pins 418 axially through the openings 426 to interlock the seal segment 412 with the carrier 414. After the pins 418 are inserted, the cover plate 422 is coupled to the fore support arm 446 to close the first opening 426 and block gases from passing into the cavity 442 and to block the pins 418 from escaping through the first opening 426.

The coupling step includes sliding each cover plate 422, 424 into the respective retaining slot 458. Once the mount system 416 is installed, the method continues by installing the turbine shroud assembly 410 in the turbine section 118 of the gas turbine engine 110.

Figure 10:
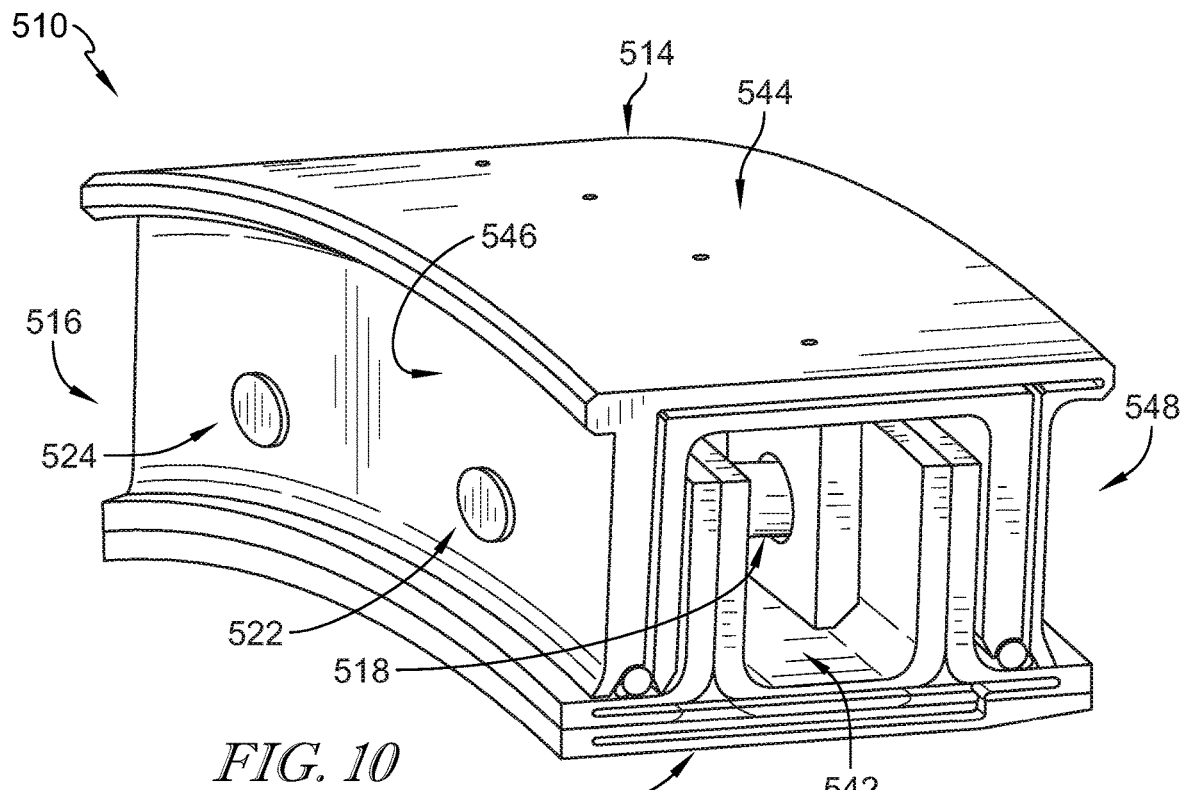
FIG. 10 is a perspective view of another embodiment of a turbine shroud assembly for use in the gas turbine engine of FIG. 1 showing the turbine shroud assembly includes a seal segment, a carrier, and a mounting assembly, the mount system including pins that extend axially through the seal segment and the carrier and cover plates coupled with the pins to block gases from flowing through the pin holes in the carrier.
Figure 11:
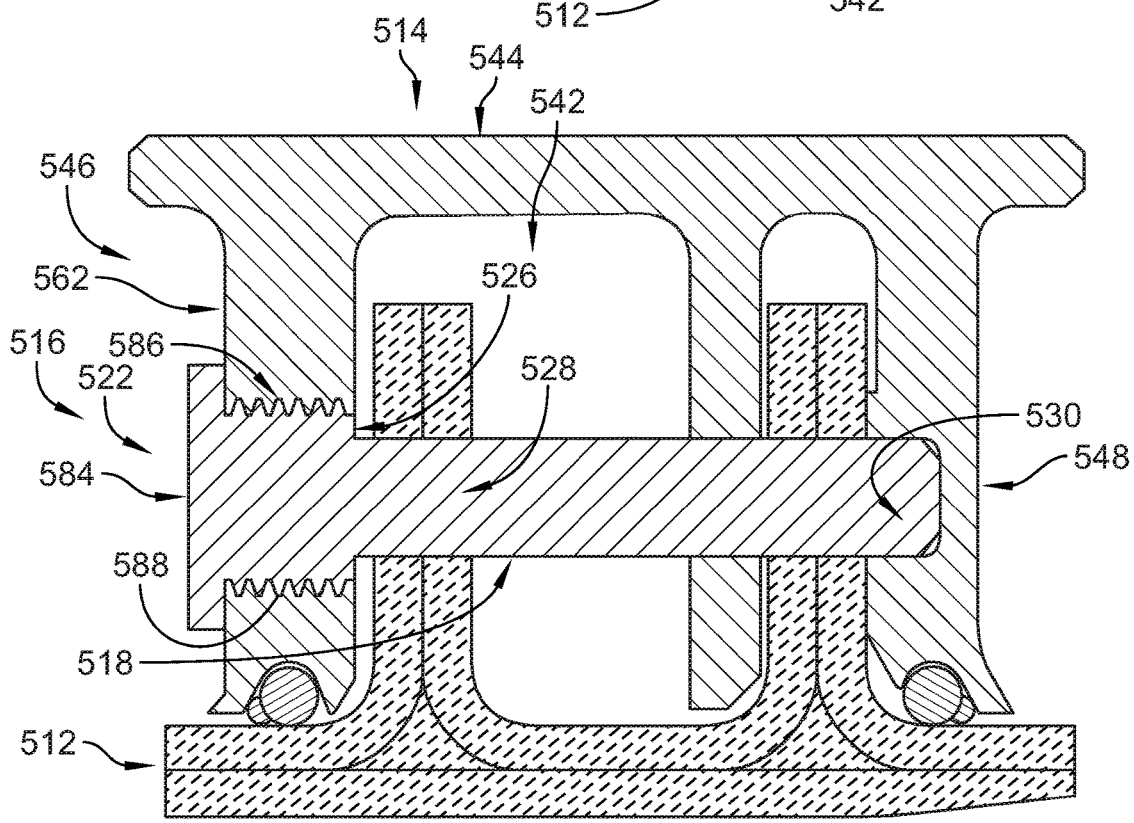
FIG. 11 is a section view of the turbine shroud assembly of FIG. 11 showing the cover plate is integrally formed with the pin to form a single, one-piece component that couples the seal segment to the carrier, blocks axial movement of the pin, and seals a cavity of the carrier.

Another embodiment of a turbine shroud assembly 510 in accordance with the present disclosure is shown in FIGS. 10 and 11. The turbine shroud assembly 510 is substantially similar to the turbine shroud assembly 10 shown in FIGS. 1-5 and described herein. Accordingly, similar reference numbers in the 500 series indicate features that are common between the turbine shroud assembly 10 and the turbine shroud assembly 510. The description of the turbine shroud assembly 10 is incorporated by reference to apply to the turbine shroud assembly 510, except in instances when it conflicts with the specific description and the drawings of the turbine shroud assembly 510.

The turbine shroud assembly 510 includes a seal segment 512, a carrier 514, and a mount system 516 as shown in FIGS. 10 and 11. The seal segment 512 extends at least partway about an axis 11 of the gas turbine engine 110 to define a portion of the gas path 17 of the gas turbine engine 110. The carrier 514 is configured to support the seal segment 512 in position radially relative to the axis 11. The mount system 516 is configured to couple the seal segment 512 with the carrier 514 and seal the turbine shroud assembly 510.

The carrier 514 includes an outer wall 544, a fore support arm 546, and an aft support arm 548 as shown in FIGS. 10 and 11. The outer wall 544 extends circumferentially at least partway about the axis 11. The fore support arm 546 extends radially inward from the outer wall 544. The aft support arm 548 extends radially inward from the outer wall 544 and is spaced apart axially from the fore support arm 546 to define a cavity 542 that receives the seal segment 512.

In the illustrative embodiment, the fore support arm 546 includes a band 562 formed to define a plurality of first openings 526 as shown in FIG. 11. The band 562 extends radially inward from the outer wall 544 of the carrier 514. The first opening 526 extends axially through the band 562.

The mount system 516 includes pins 518 and a cover plate 522, 524 as shown in FIGS. 10 and 11. Each pin 518 extends axially through one of the first openings 526 formed in the fore support arm 546 of the carrier 514, a second opening 528 formed in the seal segment 512, and into a third opening 530 formed in the aft support arm 548 of the carrier 514 to interlock the seal segment 512 with the carrier 514. The cover plate 522, 524 engages the fore support arm 546 to close the corresponding first openings 526 and block gases from passing into the cavity 542 formed in the carrier 514 through the first opening 526.

Each cover plate 522, 524 includes a panel 584 and a peg 586 as shown in FIG. 11. The panel 584 engages the fore support arm 546. The peg 586 extends axially into the first opening 526 and mates with the threads 588 formed in the first opening 526. In the illustrative embodiment, the cover plate 522, 524 is integrally formed with the corresponding pin 518 to form a single, piece component. In such embodiments, the pin 518 extends from the peg 586.

A method of assembling and using the turbine shroud assembly 510 may include several steps. The method includes locating the seal segment 512 in the cavity 542 formed in the carrier 514 and inserting the pins 518 axially through the openings 526 to interlock the seal segment 512 with the carrier 514. After the pins 518 are inserted, the method includes coupling the cover plates 522, 524 to the fore support arm 546 to close the first opening 526 and block gases from passing into the cavity 542 and to block the pins 518 from escaping through the first opening 526.

The coupling step includes mating the threads of the peg 586 with the threads in the respective retaining slot 558. Once the mount system 516 is installed, the method continues by installing the turbine shroud assembly 510 in the turbine section 118 of the gas turbine engine 110.

Figure 12:
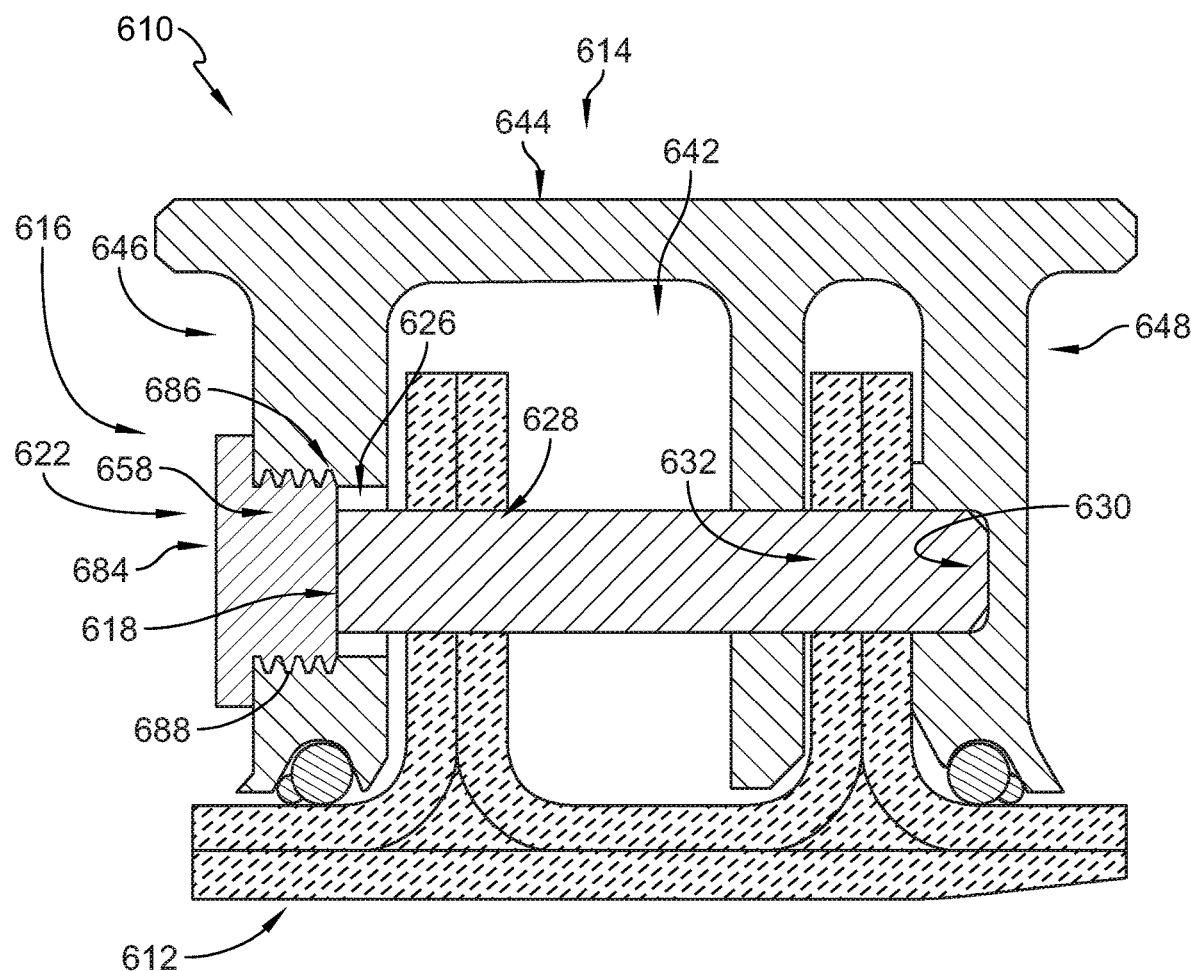
FIG. 12 is a section view of another embodiment of a turbine shroud assembly for use in the gas turbine engine of FIG. 1 showing the turbine shroud assembly includes a seal segment, a carrier, and a mounting assembly, the mount system including pins that extend axially through the seal segment and the carrier and a cover plate coupled with the carrier to block gases from passing through the pin holes in the carrier, and further showing the cover plate includes a panel that engages the carrier and a peg that is threaded into the carrier.

Another embodiment of a turbine shroud assembly 610 in accordance with the present disclosure is shown in FIG. 12. The turbine shroud assembly 610 is substantially similar to the turbine shroud assembly 10 shown in FIGS. 1-5 and described herein. Accordingly, similar reference numbers in the 600 series indicate features that are common between the turbine shroud assembly 10 and the turbine shroud assembly 610. The description of the turbine shroud assembly 10 is incorporated by reference to apply to the turbine shroud assembly 610, except in instances when it conflicts with the specific description and the drawings of the turbine shroud assembly 610.

The turbine shroud assembly 610 includes a seal segment 612, a carrier 614, and a mount system 616 as shown in FIG. 12. The seal segment 612 extends at least partway about an axis 11 of the gas turbine engine 110 to define a portion of a gas path 17 of the gas turbine engine 110. The carrier 614 is configured to support the seal segment 612 in position radially relative to the axis 11. The mount system 616 is configured to couple the seal segment 612 with the carrier 614 and seal the turbine shroud assembly 610.

The carrier 614 includes an outer wall 644, the fore support arm 646, and the aft support arm 648 as shown in FIG. 12. The outer wall 644 extends circumferentially at least partway about the axis 11. The fore support arm 646 extends radially inward from the outer wall 644. The aft support arm 648 extends radially inward from the outer wall 644 and is spaced apart axially from the fore support arm 646 to define a cavity 642 that receives the seal segment 612.

The mount system 616 includes a pin 618 and a cover plate 622 as shown in FIG. 12. The pin 618 extends axially through a first opening 626 formed in the fore support arm 646 of the carrier 614, a second opening 628 formed in the seal segment 612, and into a third opening 630 formed in the aft support arm 648 of the carrier 614 to interlock the seal segment 612 with the carrier 614. The cover plate 622 engages the fore support arm 646 to close the first opening 626 and block gases from passing into the cavity 642 formed in the carrier 614 through the first opening 626.

The cover plate 622 includes a panel 684 and a peg 686 as shown in FIG. 12. The panel 684 engages the fore support arm 646. The peg 686 extends axially into the first opening 626 and mates with the threads 688 formed in the first opening 626. In the illustrative embodiment, the cover plate 622 is a separate component from the pin 618. The panel 684 is larger in size or diameter than the opening 626 and pin 618.

A method of assembling and using the turbine shroud assembly 610 may include several steps. The method includes locating the seal segment 612 in the cavity 642 formed in the carrier 614 and inserting the pins 618 axially through the openings 626 to interlock the seal segment 612 with the carrier 614. After the pins 618 are inserted, the method includes coupling the cover plate 622 to the fore support arm 646 to close the first opening 626 and block gases from passing into the cavity 642 and to block the pins 618 from escaping through the first opening 626.

The coupling step includes inserting the peg 686 into the respective retaining slot 658 and mating the threads of the peg 686 with the threads in the respective retaining slot 658. Once the mount system 616 is installed, the method continues by installing the turbine shroud assembly 610 in the turbine section 118 of the gas turbine engine 110.

The present disclosure relates to methods for supporting and sealing a ceramic matrix composite seal segment 12, 212, 312, 412, 512, 612 with an inverted Greek letter Pi shape. In the illustrative embodiment, the mount system 16, 216, 316, 416, 516, 616 includes pins 18, 20, 218, 220, 318, 418, 518, 618 for radial and circumferential support. The pin attachment method may provide a simplified mechanical attachment that also reduces/eliminates bending stresses in the seal segment 12, 212, 312, 412, 512, 612.

Additionally, the introduction of the pins 18, 20, 218, 220, 318, 418, 518, 618 may result in new leakage paths. As such, the present disclosure teaches a cover plate 22, 222, 322, 422, 424, 522, 524, 622 that may retain the pins 18, 20, 218, 220 318, 418, 518, 618 as well as seal the pin holes 26, 426, 526, 626.

In the illustrative embodiment of FIGS. 2-5, the seal segment 12 is inserted radially into the carrier 14 and then the pins 18, 20 are inserted from the front side of the carrier 14. The pins 18, 20 are inserted through the holes 26 in the carrier 14 and the holes 28, 32 in the seal segment 12.

To retain the pins 18, 20, the cover plate 22 is inserted into the retaining slot 58 on the fore support arm 46 of the carrier 14. The cover plate 22 also seals the holes 26 in the carrier 14. The pressure change across the cover plate 22 pushes the cover plate 22 axially aft and against the fore support arm 46 of the carrier 14. The pressure ensures the cover plate 22 engages the fore support arm 46 and seals the opening 26.

The retention features 64, 66 for the cover plate 22 block movement of the cover plate 22 away from the carrier 14. Holes 56 in the outer wall 44 of the carrier 14 allow cooling air to be delivered to the backside of the seal segment 12 to reduce thermal stresses in the part (leading edge, trailing edge, slash face, and attachment thermal stresses).

The intermediate and aft support arms 50, 48 form a clevis type feature around the second mount post 40 of the seal segment 12. The clevis may help prevent the pins 18, 20 from bending, which reduces the stress around the pin holes 28, 32. There are chamfers around the outer edges of the pin holes 28, 30 in the illustrative embodiment, which also help to reduce the bending stress in this area.

In the illustrative embodiment, the cover plate/carrier interface is a linear path. The linear path of the cover plate 22 may simplify machining and assembly compared to the circumferential cover plate 322 arrangement as shown in FIG. 7. The outer and inner flanges 64, 66 on the carrier 14 are segmented and do not run the entire length of the carrier 14 in the illustrative embodiment of FIG. 4.

In the illustrative embodiment of FIGS. 10 and 11, a threaded attachment is included on the cover plate 522 and the cover plate 522 and pin 518 are an integral component. The head or panel 584 of the cover plate 522 surrounds the opening 526, while the threads on the peg 586 act as a flow restrictor. The head 584 is larger in size or diameter than the opening 526 and pin portion 518. A deformed thread may be used as a retention mechanism for the pin 518 and cover plate 522. The pressure change across the panel 584 would push the pin 518 and cover plate 522 in place.

In the illustrative embodiment of FIGS. 8 and 9, a plurality of cover plates 422, 424 close off/seal the pin holes 426 in the carrier 414. The cover plates 422, 424 may be installed from the outward of the outer wall 444 the carrier 414 into a retaining slot 458 machined into the carrier 414 after the pins 418 are in position. In the illustrative embodiments, the cover plates 422, 424 may be of similar shape and size. In other embodiments, the cover plate 424 may be larger than the cover plate 422 depending on the size/diameter of the opening 426 associated with the corresponding cover plate 424.

The mounting method of the present disclosure may provide several advantages compared to other embodiments. In some embodiments, the clevis feature of the carrier 14, 214, 314, 414, 514, 614 may deliver a reduction in bending stresses within ceramic matrix composite seal segment 12, 212, 312, 412, 512, 612. Additionally, no clamping or axial pre-load of assembly may be needed. As such, the use of springs/threads in an extremely challenging environment (creep is less of a concern) may be eliminated.

In some embodiments, contact stresses in the attachment may be reduced. Further, the simplified installation and sealing arrangement of the mount system 16, 216, 316, 416, 516, 616 may reduce part count. The arrangement may also allow for cooling holes located directly above hot spots in seal segment 12, 212, 312, 412, 512, 612 to reduce thermal stresses in the part.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A shroud assembly adapted for use with a gas turbine engine, the shroud assembly comprising
    a seal segment comprising ceramic matrix composite materials, the seal segment including a shroud wall that extends circumferentially partway around an axis to define a gas path boundary of the shroud assembly and at least one mount post that extends radially outward away from the shroud wall,
    a carrier comprising metallic materials and configured to support the seal segment in position radially relative to the axis, the carrier including an outer wall that extends circumferentially at least partway about the axis, a first support arm that extends radially inward from the outer wall, and a second support arm that extends radially inward from the outer wall and spaced apart axially from the first support arm to define a cavity that receives the at least one mount post of the seal segment, and
    a mount system configured to couple the seal segment with the carrier, the mount system including at least one pin that extends axially through a first opening in the first support arm, a second opening in the at least one mount post, and into a third opening in the second support arm to interlock the seal segment with the carrier and a cover plate coupled with the carrier and engaged with the first support arm to close the first opening and block gases from passing into the cavity through the first opening and to block the pin from escaping through the first opening.

2. The shroud assembly of claim 1, wherein the first support arm is formed to define a retaining slot that is sized to receive a portion of the cover plate and the cover plate is slidingly received in the retaining slot.

3. The shroud assembly of claim 2, wherein the first support arm includes a band that extends radially inward from the outer wall of the carrier, an outer flange that extends axially away from the band and radially inward relative to the axis to form a portion of the retaining slot, and an inner flange that extends axially away from the band and radially outward relative to the axis to define another portion of the retaining slot.

4. The shroud assembly of claim 3, wherein the retaining slot extends in a linear path and the cover plate includes an outer radial wall and an inner radial wall that are planar to allow the cover plate to translate in a single linear direction into the retaining slot.

5. The shroud assembly of claim 3, wherein the retaining slot and the cover plate curve circumferentially partway about the axis.

6. The shroud assembly of claim 2, wherein the cover plate includes an anti-rotation feature that engages the first support arm to block circumferential movement of the cover plate in the retaining slot relative to the carrier.

7. The shroud assembly of claim 2, wherein the retaining slot extends radially through the outer wall and partway into the first support arm and opens into the first opening.

8. The shroud assembly of claim 1, wherein the cover plate includes a panel that engages the fore support arm and a peg that extends axially into the first opening and mates with the threads formed in the first opening.

9. The shroud assembly of claim 8, wherein the cover plate is integrally formed with the pin to form a single, piece component and the pin extends from the peg.

10. The shroud assembly of claim 1, wherein the cover plate includes a body and an anti-rotation tab coupled with the body and configured to plastically deform relative to the body and engage the first support arm to block circumferential movement of the cover plate relative to the carrier.

11. A shroud assembly adapted for use with a gas turbine engine, the shroud assembly comprising
    a seal segment that extends circumferentially at least partway around an axis to define a gas path boundary of the shroud assembly,
    a carrier configured to support the seal segment in position radially relative to the axis, the carrier including an outer wall that extends circumferentially at least partway about the axis, a first support arm that extends radially inward from the outer wall, and a second support arm that extends radially inward from the outer wall and spaced apart axially from the first support arm to define a cavity that receives the seal segment, and
    a mount system configured to couple the seal segment with the carrier, the mount system including at least one pin that extends axially through a first opening in the first support arm, a second opening in the seal segment, and into a third opening in the second support arm and a cover plate coupled with the carrier and engaged with the first support arm to close the first opening.

12. The shroud assembly of claim 11, wherein the first support arm is formed to define a retaining slot that is sized to receive a portion of the cover plate and the cover plate is slidingly received in the retaining slot.

13. The shroud assembly of claim 12, wherein the first support arm includes a band that extends radially inward from the outer wall of the carrier, an outer flange that extends axially away from the band and radially inward relative to the axis to form a portion of the retaining slot, and an inner flange that extends axially away from the band and radially outward relative to the axis to define another portion of the retaining slot.

14. The shroud assembly of claim 13, wherein the retaining slot extends in a linear path and the cover plate includes an outer radial wall and an inner radial wall that are planar to allow the cover plate to translate in a single linear direction into the retaining slot.

15. The shroud assembly of claim 12, wherein the retaining slot and the cover plate curve circumferentially partway about the axis.

16. The shroud assembly of claim 12, wherein the retaining slot extends radially through the outer wall and partway into the first support arm and opens into the first opening.

17. The shroud assembly of claim 11, wherein the cover plate includes a panel that engages the fore support arm and a peg that extends axially into the first opening and mates with the threads formed in the first opening.

18. The shroud assembly of claim 17, wherein the cover plate is integrally formed with the pin to form a single, piece component and the pin extends from the peg.

19. A method comprising
providing a seal segment, a carrier, and a mounting assembly, the carrier including an outer wall that extends circumferentially at least partway about the axis, a first support arm that extends radially inward from the outer wall, and a second support arm that extends radially inward from the outer wall and spaced axially apart from the first support arm to define a cavity that receives a portion of the seal segment, and the mount system including a pin and a cover plate, locating the seal segment in the cavity formed in the carrier so that a first opening formed in the first support arm, a second opening formed in the seal segment, and a third opening formed in the second support arm align, inserting the pin axially through the first opening formed in the first support arm, the second opening formed in the seal segment, and the third opening formed in the second support arm to interlock the seal segment with the carrier, coupling the cover plate to the first support arm to close the first opening and block gases from passing into the cavity through the first opening and to block the pin from escaping through the first opening.

20. The method of claim 19, wherein the method further includes engaging an anti-rotation feature formed in the cover plate with the first support arm of the carrier to block movement of the cover plate relative to the carrier.

* * * * *